United States Patent Office 3,009,783
Patented Nov. 21, 1961

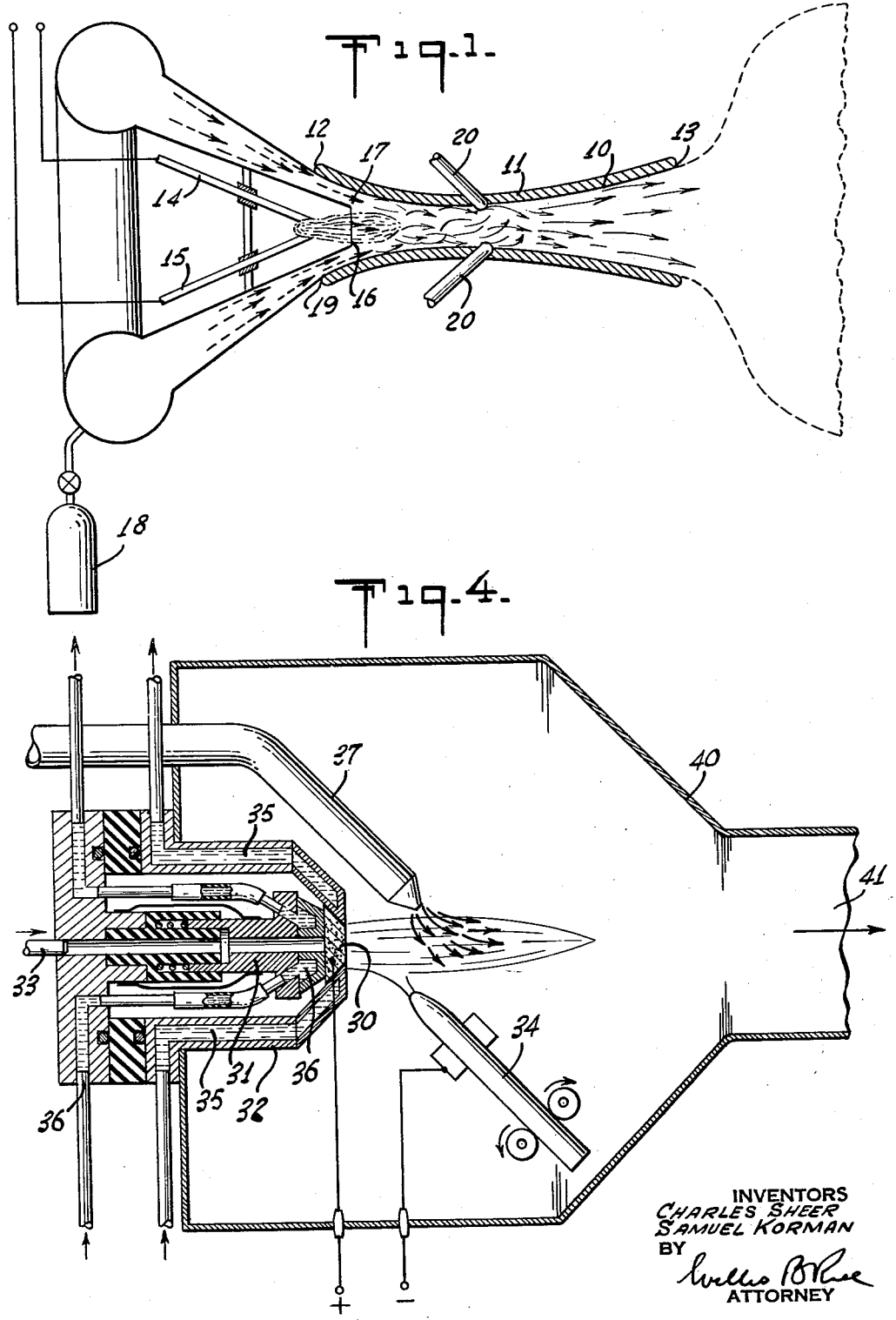

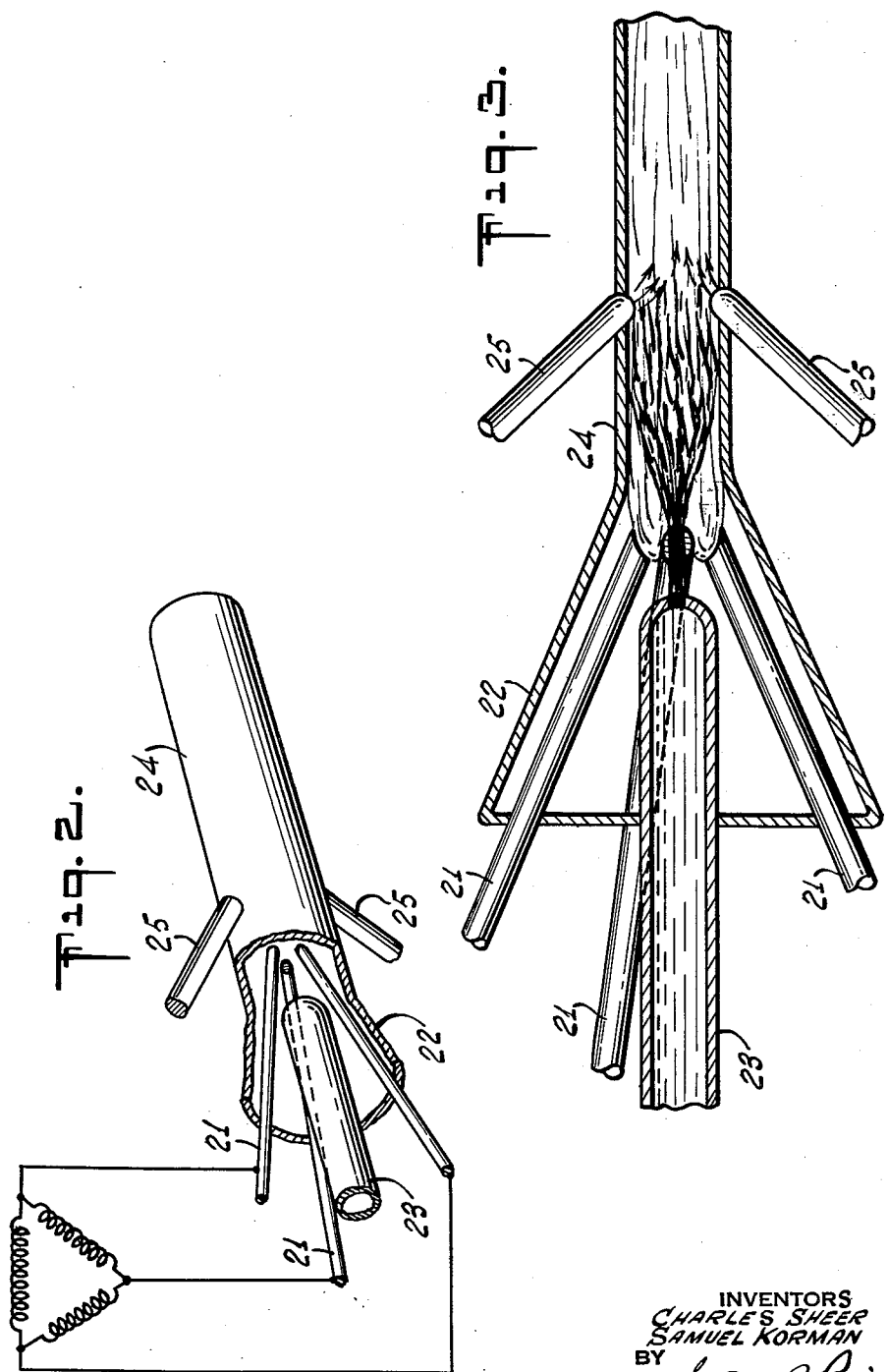

3,009,783
PRODUCTION OF CARBON BLACK
Charles Sheer, Teaneck, N.J., and Samuel Korman, Cedarhurst, N.Y., assignors to Sheer-Korman Associates Inc., New York, N.Y., a corporation of Delaware
Filed Dec. 4, 1959, Ser. No. 857,416
5 Claims. (Cl. 23—209.3)

It is the object of this invention to produce elemental carbon, commonly known as carbon black, which will be free from objectionable contamination by hydrocarbon compounds.

It is a further object to provide a process which will permit a high degree of flexibility in controlling the structural shape and physical properties of the carbon black particles.

In existing processes it is impossible to control the shape of the carbon black particles, and it is possible to regulate the average particle size only by serious sacrifice in efficiency and yield. It is a further object of this invention to disclose means whereby the carbon black particles may be alternatively produced as spheroidal or filamentary in shape and in which the particle size may be controlled at will without any sacrifice in process efficiency and yield.

It is a further object of this invention to produce carbon and hydrogen in elemental form by the decomposition of a hydrocarbon by the application of high intensity energy, such as can be attained in a high intensity arc, or hierarc, as it has come to be called, with greater efficiency and yield.

It is a further object to produce carbon in ultrafine sized particulation by extremely rapid thermal decomposition of the hydrocarbon vapors available during the passage of the feed material through the high temperature of a hierarc, followed by rapid quenching of the decomposition products.

This case is a continuation in part of our pending application, Serial No. 674,299, filed July 26, 1957, which is accordingly abandoned in favor of this application. This substitution is filed to include with the method and apparatus disclosed in that application, variations and improvements of apparatus which render the process more effective for many purposes.

In particular, one modification of this invention is capable of producing carbon black in the form of extremely fine carbon filaments, which has never heretofore been achieved by prior processes.

The substance of the parent application is retained herein, as the first embodiment here disclosed.

We have demonstrated in our earlier patents that the hierarc is an efficient means of conducting thermal processes at very high rates and efficiency of power and enery transfer.

We have conducted such processes where we have applied the energy primarily to refractory substances, such for example, as refractory solids, by providing for their exposure to the transfer region by incorporating them into the anode of the discharge so that as the electrode was eroded, the material was vaporized, and passed into and through the region of discharge known as the anode fall space.

In this way we developed technology for conducting high temperature vapor phase reactions involving refractory materials, since in such an arc even refractories are converted to vapor phase. In this work we also showed how to fabricate electrodes as a means for the controlled introduction of these refractory materials into the anode fall space and reaction zone.

In the present invention we disclose a method of applying that principle to the transfer of high energy at very high temperatures to fluids.

It is here disclosed particularly as applied to both liquid and gases containing or comprising compounds of carbon and hydrogen, commonly referred to as hydrocarbons. This results in a breakdown of the fluid molecules with the production of elemental hydrogen and elemental carbon in finely divided form, such as is commonly known as carbon black. The word "fluid" as used herein, means either a liquid or a gas at ordinary temperatures, and which are therefore not refractory substances.

In the hierarc process for producing carbon black from hydrocarbon materials the arc flame is used primarily as an energy source whose particular configuration and properties are such as to permit virtually quantitative efficiency for the cracking process. Examples of such fluids are methane ($CH_4$), natural gas, which consists primarily of methane, but the class also contains higher homologues thereof, and residues of petroleum and its processing, for example, coker gas oil and thermal tar.

This effect of the hierarc is in contrast to the channel and other similar conventional processes. The arc tail flames does not involve combustion or chemical reaction of any kind between the primary flame constituents and the hydrocarbon. Thus the transfer of energy from the flame to the hydrocarbon vapor is not hampered by the conflicting requirements and reaction kinetics of a competing reaction, as in the case of conventional processes where the decomposition energy is obtained from combustion of a portion of the hydrocarbon. Thus substantially all of the energy which flows away from the arc crater via the electrically generated jet of vapor may be used to supply the energy necessary to decompose the hydrocarbon, rendering it possible to achieve virtually quantitative yields.

Although the temperature in the initial portions of the tail flame is considerably in excess of the decomposition temperatures of available hydrocarbon materials, nevertheless this initial extremely high concentration of energy provides the motive force for a high speed cylindrical jet flame, characterized by very high energy flux.

In the thermal decomposition of such compound for the purpose of producing the elemental constituents—carbon and hydrogen, it is very desirable and for many purposes essential to avoid both the incomplete decomposition of the compound on the one hand, and on the other the reversion of products resulting from the decomposition into synthetic hydrocarbon oils.

The principles which from the standpoint of thermal equilibrium would preclude or minimize such side effects require first that the hydrocarbon fluid be brought to a very high temperature, which should be above 4000° K. in order to secure the complete dissociation of the carbon fluid into carbon and hydrogen. The tail flame of the high intensity arc is characterized by temperatures well in excess of 4000° K. so that such complete dissociation of the jet hydrocarbon can and indeed does occur.

Then for the recovery of the resultant products without reunion, the resultant products must be brought very quickly to a temperature below say 600° K. in order to avoid resynthesis of compounds which are not desired. This may be done by injecting into the flame a quenching fluid, which does not interfere with the dissociation process but which serves to shock-chill the effluent gas to obtain the maximum quench of the high temperatures. It is also possible to use a fine spray of liquid such as water to accomplish the same result. In this way advantage may be taken of the extra energy absorbed in vaporization of a liquid due to the latent heat of vaporization.

This process will be better understood by reference to the accompanying drawings, in which several different ways of carrying out the process are shown.

In the drawings,

FIG. 1 is a diagrammatic elevation of an apparatus for conducting this process in accordance with our copending application Ser. No. 674,299, filed July 26, 1957, for which this application is a continuation in part.

FIGURES 2 and 3 are details of a modification of the apparatus of FIG. 1, in which FIG. 2 is a perspective view showing the relationship of the electrodes, the gas intake tube, and the quenching steam tubes. FIG. 3 is a fragmentary side elevation with the tube in section to show the relative position of the arc flame to the hydrocarbon intake entrance, and the quenching tubes.

FIG. 4 is a diagrammatic view of the third embodiment of this invention in which the hydrocarbon is introduced through the surface of a porous anode and comprises the medium in which the gas conduction processes of the hierarc take place.

We refer now to the first embodiment which may be carried out by means of the apparatus disclosed in FIG. 1.

In this apparatus, the numeral 10 represents a generally tubular chamber which may gradually expand from the middle toward each end, providing a contracting throat 11 at the middle and expanding to its inlet 12 at one end and to an outlet 13 for discharge at the other.

Electrodes 14 and 15 of an electric hierarc are mounted on the intake end 16 of the chamber 10 positioned to discharge a hierarc flame down the center of the tubular chamber 10. In the form here illustrated, the carbon electrodes, of which there are two here, are inclined toward each other at the end of the mouth of the chamber, and the arc is maintained in this arrangement by A.C. current. It will be understood that if a three-phase current is employed three electrodes will be employed, symmetrically spaced around the axis, these being also arranged to discharge a flame down the axis of the chamber 10. If D.C. current is employed the electrodes will be repositioned so as to discharge the arc flame substantially along the axis.

Around the arc, and discharging into the arc stream at the intake end of the chamber are a plurality of nozzles or an annular nozzle 17 into which the hydrocarbon is fed from a supply 18.

The intake end 19 of the chamber 10 is completely closed at 19 so that the only materials discharged down the axis of the chamber 10 are the arc stream from the hierarc and the hydrocarbon from the nozzle 17.

As the hydrocarbon is discharged into the arc stream in the chamber it is projected into the ultrahigh temperature region of the arc stream and it is completely dissociated.

In order to prevent resynthesis of hydrocarbons and to insure fine particulation as the arc stream cools we provide through the chamber wall quenching streams of hydrogen 20, helium or any other gas which will not react with the carbon, to bring the composite effluent gases to temperatures of say 600° before chemical recombination of the dissociated hydrocarbon can take place. One of the most useful and effective quenching fluids has been found to be water. The exact rate of quenching and the location of the quenching jet will depend upon the relative power and configuration of the hierarc, but it can readily be determined by the results in any given situation.

The resultant product will be a stream of hydrogen with or without other quenching gases, carrying the carbon black. This may be filtered out in any well known manner or as later described.

In the form of the invention disclosed in FIGS. 2, and 3, three electrodes 21 in triangular formation extend into a chamber 22 and each is inclined toward the axis of the chamber at an angle of about 24°. In FIG. 2 the parts of the chamber are broken away in order to show the operation. A nozzle 23 injects a hydrocarbon as a fine stream of liquid or gas into the arc formed by the electrodes 21 along the axis of the arc stream, where the mixture may be confined by a refractory tube 24, forming a continuation of the chamber 22. The gas as it enters the center of the arc stream in the relatively quiescent space between the electrodes and thence into the tube 24 mingles thoroughly with the arc vapors and is completely dissociated.

This embodiment possesses the advantage over the first embodiment that all of the hydrocarbon must pass through the arc stream, without depending upon the mechanical constraints of the constricted throat 11 shown in FIG. 1 to provide insurance of turbulent mixing for maximum energy transfer from flame to fluid, which results in the complete dissociation of the hydrocarbon. Jets 25 of inactive coolant gas as liquid spray are introduced into the arc stream at a proper point to chill the products below recombination temperature, as above described.

The location of the quenching jets and the quantity of coolant gas or spray fluid introduced will be varied in accordance with the particular energy transfer requirement to cool the effluent from the reaction zone to a temperature below about 600° K. as rapidly as possible.

The carbon being in finely divided form may be collected in any customary manner.

In the third embodiment we employ as anode of a hierarc a porous block such as graphite. The hydrocarbon to be processed is caused to pass through the pores of such a block. An arc is maintained between the porous block and a cathode situated on the side to which the gas is flowing. The anode block is maintained at a low temperature by the passage of the hydrocarbon through it, and the arc flame comprises the hydrocarbon gases which are heated to ionizing temperature by the current.

As shown in FIG. 4, the numeral 30 comprises the porous block which is clamped against a terminal 31 by an outer frame 32. The terminal 31 is hollow and serves as a conduit to lead the hydrocarbon to the inner face of the block 30 and force it to pass through the pores of the block. The hydrocarbon is fed to the terminal through a tube 33. The cathode 34 is supported adjacent to the outer face of the porous block 30 a little to one side of the center line as shown. The frame 32 is preferably water cooled as shown at 35, and the terminal 31 is cooled as shown at 36. The cathode 34 is energized through a lead 34a and the porous block 30 is energized through a lead 30a.

A quenching jet 37 is mounted to discharge the quenching fluid into the arc flame at the proper point where the feed hydrocarbon is broken down and before it has cooled enough to reform. This quenching jet is preferably an atomized liquid spray, although argon, nitrogen or hydrogen may be used.

A chamber 40 encloses the jet, having a discharge orifice at 41 so that gas discharged through the quenching jet may be carried off and the cabon may be pecipitated.

By proper flow of the arc stream and the current and the quenching jet the carbon black may be produced of very fine particulation.

The process by its controls may be regulated to produce any dregree or kind of carbon black desired.

The anode is sufficiently porous to permit the hydrocarbon to pass through it at the maximum rate that can be effectively dissociated by the arc chosen.

The operation is started by filling the chamber 40 with the carrier gas, such as hydrogen. Then the arc is struck between the cathode 34 and the porous block, and then starts the flow of hydrocarbon through the sintered block. As the cathode is withdrawn the zone of gas conduction spreads to the entire surface of the anode block. By a sufficient power input the entire stream of hydrocarbon vapor is ionized and dissociated.

The dissociation temperature is attained within the gas stream, and not at the anode face, so that the porous block is not subjected to ultrahigh temperatures. In fact, it has been found that anode surface is actually cooled by the flow of the gas through the block.

The rapid cooling by quenching insures fine particulation and prevents any recombination from taking place.

The operation of this process has produced molecular forms of carbon that have, so far as we are aware, never been known before. In these forms the carbon particles appear to be minute nuclei joined by carbon filaments of atomic dimensions.

What is claimed:

1. A process of producing carbon black from a body of hydrocarbon compounds which comprises injecting a stream of said compound into a region where it is all subjected to an ionizing electrical discharge at a temperature above 4000° C. and then reducing the temperature of the resultant mixture of ionized gases below the temperature of recombination.

2. A process of forming carbon black which comprises passing hydrocarbon fluid through a porous mass toward a cathode fixed in juxtaposition to said mass, causing a high current to pass through said mass to said cathode, said current being sufficient to ionize the gases to the point where the gases themselves become the conductor, resulting in the dissociation and ionization of the gases, then cooling the resultant mixture below the temperature of recombination.

3. A process of forming carbon black which comprises establishing a hierarc with a carbon anode, and injecting into and thoroughly mingling with the tail flame of the arc a hydrocarbon at a point where the temeprature of the flame is above the decomposition temperature of the hydrocarbon, cooling the gases below the temperature of recombination and collecting the carbon so formed.

4. A process of forming carbon black which comprises establishing a hierarc with a carbon anode, an injecting into and thoroughly mingling with the tail flame of the arc a hydrocarbon at a point were the temperature of the flame is above the decomposition temperature of the hydrocarbon, cooling the gases below the temperature of recombination with sufficient rapidity to insure fine particulation.

5. A process of forming carbon black which comprises passing fluid containing hydrocarbon or derivative thereof through the porous anode of a hierarc, wherein the effective pore diameter does not exceed the thickness of the anode fall space through which the fluid passes, and rapidly cooling the resultant mixture below the temperature of recombination.

References Cited in the file of this patent

UNITED STATES PATENTS

| | | |
|---|---|---|
| 1,339,225 | Rose | May 4, 1920 |
| 1,536,612 | Lewis | May 5, 1925 |
| 2,002,003 | Eisenhut et al. | May 21, 1935 |
| 2,572,851 | Gardner | Oct. 30, 1951 |
| 2,616,842 | Sheer et al. | Nov. 4, 1952 |